United States Patent Office 3,746,740
Patented July 17, 1973

3,746,740
ESTERS OF 9-FLUORENE CARBOXYLIC ACID AND DERIVATIVES THEREOF
Gunther Mohr and Dietrich Erdmann, Darmstadt, Konrad Niethammer, Traisa, and Siegmund Lust and Gerhart Schneider, Darmstadt, Germany, assignors to E. Merck A.G., Darmstadt, Germany
No Drawing. Original application Nov. 19, 1965, Ser. No. 508,835, now Patent No. 3,476,545, dated Nov. 4, 1969. Divided and this application Oct. 15, 1969, Ser. No. 870,927
Claims priority, application Germany, Nov. 27, 1964, M 63,287; Mar. 13, 1965, M 64,518
Int. Cl. C07c 69/76
U.S. Cl. 260—469      10 Claims

ABSTRACT OF THE DISCLOSURE

Esters of 9-fluorene carboxylic acid and derivatives thereof useful for regulating plant growth.

---

This application is a divisional application of parent application Ser. No. 508,835, filed Nov. 19, 1965, now Pat. No. 3,476,545, issued Nov. 4, 1969. The same claim of priority is made for this application as was made in the parent application, the certified copies of German applications M 63,287 IVa/45 1 and M 64,518 IVa/45 1 of Nov. 27, 1964, and Mar. 13, 1965, respectively, being located in the file of the parent application.

This invention relates to the application of chemicals to plants, and in particular to such chemicals which function as morpho-regulators, i.e. agents which influence plant development in a histological-anatomic and morphological manner.

One object of this invention, therefore, is to provide a method of effecting morpho-regulatory activity in plants.

Another object is to provide compositions in solid or liquid form for effecting morpho-regulatory activity in plants consisting of novel chemical compounds and usual carrier materials.

A still further object is to provide novel chemical compounds and processes for their production.

Upon further study of the specification and appended claims, other objects and advantages of this invention will become apparent.

To attain the objects of this invention, there are provided agents containing one or more fluorene-9-carboxylic acid derivatives of Formula I, as follows:

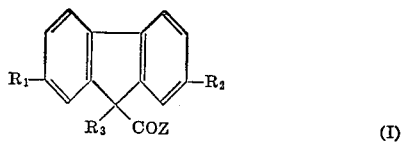

wherein $R_1$ and $R_2$, being identical or different, each represents H, Cl, Br, or I;
$R_3$ is H, OH, or Cl, and
Z is —NH—NH$_2$,

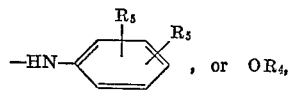

wherein $R_4$ represents a straight or branched, mono- or poly-unsaturated alkenyl or alkynyl residue of at most 6 carbon atoms and containing preferably 1-2 unsaturated bonds, this residue being, if desired, mono- or poly-substituted preferably by 1-2 OH and/or 1-2 halogen moieties; or
an alkyl residue of 1-12 carbon atoms whose alkyl chain is interrupted by 1-4 non-adjacent O- and/or S-atoms; and/or is substituted by 1-3 hydroxy groups or halogen atoms, by phenyl or naphthyl, or by a phenyl or naphthyl residue which is substituted by 1-3 hydroxy groups or by halogen atoms or by methylene dioxy; or
an aromatic or alicyclic residue of 5-10 carbon atoms being preferably carbocyclic which is, if desired, substituted by 1-3 halogen atoms or hydroxy groups or methylene dioxy; or
a substituted ammonium cation derived from an aliphatic or cycloaliphatic amine containing 1-22 carbon atoms whose hydrocarbon chain(s) are interrupted, if desired, by 1-4 —O— and/or —NH— moieties, and/or are substituted, if desired, by 1-4 OH— and/or NH$_2$-groups, and
$R_5$ is H, OH, or Cl, with the provision that $R_1$, $R_2$, and $R_5$ are not to represent H at the same time.

These substances can be employed, if desired, in mixture with herbicidally effective and/or growth-regulating substances.

The plant morpho-regulatory activity probably takes place by an intervention into the cell division and cell determination. The novel agents are absorbed into the plant and transported therein in a basipetal and aeropetal manner to the formative tissue (meristems). There, the agents have a prolonged influence on the tissue and organ formation and thus chiefly upon the new growth of the plant after the treatment. Particularly, they lead to dwarfing of the treated plants, even at an extraordinarily low concentration, and without toxic side effects. However, in addition to this general inhibition of development, there were also observed organ regressions, organ metamorphoses, organ deficiencies, and also new formations of organs.

The active substances in the agents according to the invention exhibit their morpho-regulatory effect in extreme dilutions, for example, already in the range of 0.01 to 100 p.p.m. (parts per million). The active substances are normally not phytotoxic, or only to a slight extent, so that their morpho-regulatory activity extends over a very wide range of concentration.

The deformations caused by the novel agents are observed at various parts of the plant. For example, in leaves and petals there is found a reduction of arrangement of the leaf spread (e.g. feathery leaves are not divided, serrated ones become smooth-edged), often leading to a complete loss of spread (e.g., spreadless stems, leaf stem rudiments) and furthermore suppression of leaf formation as well as leaf transformations or leaf intergrowth. Not infrequently, there is also found an earlier or increased fomation of flower buds, and in addition flower-leaf formation and flower perfoliation, as well as premature or also retarded development of other organs. On the sprouting axils of the plants, there have likewise been observed the most varying anomalies in development.

Deviations in development likewise occur at the roots, for example, an increased branching of the roots and/or a thickening of the roots.

Furthermore, numerous other effects can be obtained upon plants with the novel agents according to the invention, for example increased formation of chlorophyll, parthenocarpic fruit formation, as well as interruption of the seed rest of plant seeds with endogenic germination delay. The active materials furthermore often influence the water metabolism of plants.

The novel agents according to the invention are thus eminently suited for a general control or a special regulation of the plant development. Moreover, they are also applicable, particularly in combination with herbicidally effective and/or growth-regulating substances for combating undesirable plant growth.

Herbicidally effective substances, in this connection, are to be understood to be not only the directly phytotoxically effective substances, but also growth promoting herbicides. Such growth promoting herbicides are, for example, substituted phenoxyalkane carboxylic acids and the derivatives thereof, such as 2,4-dichlorophenoxy-acetic acid, 2-methyl-4-chlorophenoxy-acetic or 2,4,5-trichlorophenoxy-acetic acid, 2,4-dichlorophenoxy-propionic acid, 2-methyl-4-chlorophenoxy-propionic acid, 2,4,5-trichlorophenoxy-propionic acid (2,4 - dichlorophenoxy)-butyric acid, (2-methyl-4-chlorophenoxy)-butyric acid, as well as the salts and esters thereof, substituted benzoic acids and other aryl carboxylic acids, as well as arylalkane carboxylic acids, and the derivatives thereof, such as 2,3,5-triiodobenzoic acid, 2,3,6 - trichlorobenzoic acid, 2-methoxy-3,6-dichlorobenzoic acid or 2,3,6-trichlorophenyl-acetic acid; substituted benzonitriles, such as 2,6-dichlorobenzonitrile, 3,5-diiodo-4-hydroxybenzonitrile; and aryl-phthalamic acids and the derivatives thereof, such as N-naphthyl-(1)-phthalamic acid.

Furthermore suitable are herbicides without any growth promoting character, for example substituted phenylurea derivatives, such as 3-(p-chlorophenyl)-1,1-dimethyl urea; 3-(3',4'-dichlorophenyl) - 1,1 - dimethyl urea; N-phenyl-carbamic acids and the derivatives thereof, such as N-phenyl-carbamic acid isopropyl ester and N-3 - chloro-phenyl-carbamic acid isopropyl ester; triazole and triazine derivatives, such as 3-amino-1,2,4-triazole, 2-chloro-4,6 - bis - ethylamino - 1,3,5 - triazine, 2-chloro-4-ethylamino-6-isopropylamino-1,3,5-triazine, 2 - chloro - 4,6-bisisopropylamino-1,3,5-triazine; and halogenated fatty acids and derivatives, such as trichloroacetic acid and 2,2-dichloropropionic acid; maleic acid hydrozide and the derivatives thereof.

Growth-regulating substances can also be utilized, such as, for example, indole - 3 - alkane-carboxylic acids and their derivatives, such as β-indolyl-butyric acid; gibberellin and its derivatives, such as gibberellinic acid (Gibberellin A 3); kinines and their derivatives, such as 6-(L-furfuryl)-amino-purine (kinetine). In the same manner, growth-inhibiting quaternary nitrogen compounds can be employed, such as β-chloroethyltrimethyl ammonium chloride, (4-hydroxy-5-isopropyl - 2 - methyl-phenyl)-trimethyl ammonium chloride or [5-isopropyl-2-methyl-4-(piperidino-carbonyloxy) - phenyl]-trimethyl ammonium chloride; 1,1' - ethylene - 2,2' - dipyridinium-dibromide, as well as 1,1'-dimethyl-4,4'-dipyridinium-dimethyl sulfate. Still further, aryl-boric acids and the derivatives thereof, such as phenyl-boric acid, and other distinctive growth stimulants, such as urea and purine derivatives can be used.

When the agents of the invention are to be employed as herbicides, there are preferably used such substances containing, in addition to one or several fluorene-9-carboxylic acid derivatives of Formula I, one or several growth promoting herbicides from the group of the substituted phenoxy-alkane carboxylic acids, or the derivatives thereof, or a substituted benzonitrile, for example 3,5-diiodo-4-hydroxy-benzonitrile.

Particularly advantageous are such mixtures of the novel amine salts with alkali or amine salts or ester derivatives of the known phenoxy-alkane carboxylic acids, particularly 2-methyl-4-chloro-, 2,4-dichlorophenoxy-acetic acid, and 2,4-dichloro- and 2-methyl-4-chlorophenoxy-propionic acid, as well as the sodium salts and the butyl and isooctyl esters of these compounds. A particularly favorable effect was obtained when employing mixtures of the novel amine salts with maleic acid hydrazide and 3,5-diiodo-4-hydroxybenzonitrile.

Advantageously, in such combinations, the fluorene derivatives and one or several herbicidally effective substances, and/or one or several growth-regulating substances, are contained in a weight proportion of 1:50 to 1:1, preferably 1:9 to 1:3.

The active substances of the agents of the invention are previously unknown substances. The most important representatives of the novel effective agents are derivatives of 9 - fluorenol - 9 - carboxylic acid, of 2-chloro-9-fluorenol-9-carboxylic acid, of 2,7-dichloro-9-fluorenol-9-carboxylic acid, and of 9-chloro-fluorene-9-carboxylic acid. However, good success was also achieved with the corresponding bromine and iodine compounds. Of importance are furthermore the 2-halogeno or 2,7-dihalogeno-9-fluorenol-9-carboxylic acid anilide, the derivatives thereof substituted in the phenyl residue by OH and/or Cl, as well as the 9-fluorenol-9-carboxylic acid hydrazide. Also these compounds can additionally be substituted in the 2- and/or 7-position by halogen, preferably by chlorine.

The residue $R_4$ in the esters of the various fluorene-9-carboxylic acids can be, for example, an alkenyl or alkynyl residue. The alkenyl residue can contain one or more double bonds, but in general no more than two. Preferred alkenyl residues are, for example, vinyl, allyl, butenyl, butadienyl, pentenyl, pentadienyl, hexenyl, and hexadienyl. Preferred alkynyl residues are ethynyl, propargyl, or 2- or 3-butynyl. Also these residues can be mono- or poly-substituted by OH and/or halogen, preferably chlorine. Normally, the alkenyl or alkynyl residue $R_4$, however, does not contain more than 1–2 hydroxy groups or 1–2 chlorine atoms.

$R_4$ can furthermore represent an alkyl residue of 2–12 carbon atoms whose alkyl chain is interrupted by oxygen and/or sulfur atoms and which can, if desired, additionally contain 1–3 hydroxy groups or halogen atoms, preferably chlorine atoms, or phenyl, or naphthyl, or phenyl or naphthyl substituted by 1 or 3 hydroxy groups or halogen atoms, preferably chlorine atoms, or methylene dioxy. The alkyl residues between the O and/or S atoms generally contain no more than 6 carbon atoms. In total, the residue $R_4$ contains at most 2 sulfur and/or 4 oxygen atoms.

$R_4$ can also be a substituted alkyl group of 1–12 carbon atoms. Substituents to be considered are, for example, 1–3 hydroxy groups, at most 4 halogen atoms (preferably chlorine) or 1 or 2 aryl groups (preferably phenyl groups). These substituents can, in turn, be substituted by 1–3 hydroxy groups or halogen atoms, or by methylene dioxy. Finally, $R_4$ can be an aromatic or cycloaliphatic residue substituted by 1–3 halogen atoms (preferably chlorine) or hydroxy groups, or methylene dioxy. Aromatic residues are preferably phenyl and naphthyl, and cycloaliphatic residues are preferably cyclopentyl and cyclohexyl.

$R_4$ can, however, likewise be a substituted ammonium cation derived from an aliphatic or cycloaliphatic amine containing 1–22 carbon atoms whose hydrocarbon chain(s) are, if desired, interrupted by O or NH and/or substituted by OH or $NH_2$ groups.

The aliphatic or cycloaliphatic amines can be primary, secondary or tertiary amines. They are to contain, in total, no more than 22 carbon atoms. The individual hydrogen chains can be straight-chained or branched, and can be mono-, di-, or tri-unsaturated. The unsaturated compounds contain preferably only double bonds. Insofar as the hydrocarbon chain(s) are interrupted by O or NH and/or substituted by OH or $NH_2$ groups, there should not be contained in the amine, in total, more than respectively 4 NH groups and/or O atoms, or OH and/or $NH_2$ groups.

Of particular importance are primary amines having long-chained tertiary alkyl or alkenyl groups, the tertiary carbon atom being preferably immediately adjacent to the nitrogen atom. Mixtures of such amines are commercially available under the name of "Primenes."

In detail, the following amines are suitable, for example: mono-, di- and trimethylamine; mono-, di-, and triethylamine; mono-, di-, and tripropylamine, as well as the isomers thereof having branched chains; mono, di-, and tributylamine, as well as the isomers thereof having branched chains, particularly N-tert.-butyl- and isobutylamine; di-(2-ethylhexyl)-amine; n- or tert.-octylamine; bis-tert.-octylamine; decyl- and isodecylamine (particularly dimethyl-octylamine); dodecylamine, particularly tert.-dodecylamine;

$C_{10}H_{21}$—$C(CH_3)_2$—$NH_2$; $C_{11}H_{23}$—$C(CH_3)_2$—$NH_2$.

Further amines being of special importance for the present invention are, for example mono-, di-, and triethanlolamine; mono-, di-, and tri-(hydroxypropyl)-amine or mono-, di-, and tri-(hydroxybutyl)-amine; in this connection, the OH groups can be respectively in the α-, β-, or γ-position; N-(3-aminopropyl)-ethanolamine, as well as amines of the formulae

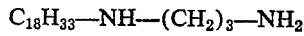

and

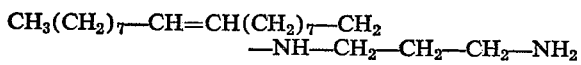

also cocoanut oil amine or soybean oil amine can be used. Cocoanut oil amine is understood to mean a mixture of preferably primary amines whose saturated hydrocarbon chains contain 6–18 carbon atoms. Technical soybean oil amine is a mixture containing predominantly oleyl-, stearyl-, and cetylamine.

Cycloaliphatic amines are mainly cyclohexylamine and cyclopentylamine.

Of particular importance, of course, are those amines which are easily obtainable and which are produced in technically sufficient quantities so that they are distinguished by being economical.

In many cases, it is recommended to employ not the individual amines, but mixtures thereof since the longer-chained amines in particular are often introduced into commerce in the form of mixtures. Likewise, isomeric amines are not separated in numerous cases, but are sold commercially as mixtures, and used for the production of the novel amine salts.

The following table lists as examples a few of the novel compounds. Involved are such compounds of Formula I wherein $Z=OR_4$.

| $R_1$ | $R_2$ | $R_3$ | $R_4$ |
|---|---|---|---|
| H | H | OH | —$CH_2$—CH=$CH_2$ |
| H | H | OH | —$CH_2$—C≡CH |
| H | H | OH | —CH($CH_3$)—C≡CH |
| H | H | OH | —$CH_2$C($CH_3$)=$CH_2$ |
| H | H | OH | —$CH_2$—CH=CH—$CH_2$OH |
| H | H | OH | —$CH_2$—CH=CH—$CH_2$Cl |
| H | H | OH | —$CH_2$—C≡C—$CH_2$Cl |
| H | H | OH | —$CH_2$—C(Cl)=CH—$CH_3$ |
| H | H | OH | —$CH_2$—CH=C(Cl)—$CH_3$ |
| H | H | OH | —$CH_2$—$(CH_2)_2$OH |
| H | H | OH | —$CH_2$—$(CH_2)_5$OH |
| H | H | OH | —$CH_2$—C($CH_3$)$_2$$CH_2$OH |
| H | H | OH | —$CH_2$—$CH_2$—O—$C_2H_5$ |
| H | H | OH | —$(CH_2)_2$—O—$(CH_2)_2$—O$C_2H_5$ |
| H | H | OH | —$(CH_2)_2$—O—$C_4H_9$ |
| H | H | OH | —$(CH_2)_2$—O—$CH_2$—$C_6H_5$ |
| H | H | OH | —$(CH_2)_2$—$C_6H_5$ |
| H | H | OH | —$(CH_2)_2$—O—⟨C6H4⟩—Cl |
| H | H | OH | —CH—($CH_2$—O$C_2H_5$)$_2$ |
| H | H | OH | —$CH_2$—CH—$CH_2$ (cyclic acetonide with C($CH_3$)$_2$) |
| H | H | OH | —$CH_2$—$(CH_2)_5$Cl |
| H | H | OH | —CH($CH_3$)—$CH_2$Cl |
| H | H | OH | —$CH_2$—$CH_2$—S—$CH_3$ |
| H | H | OH | Cyclohexyl. |
| H | H | OH | o-, m-, p-chlorobenzyl. |
| H | H | OH | 2,6-dichlorobenzyl. |
| H | H | OH | 3,4-methylenedioxy benzyl. |
| H | Cl | OH | —$CH_2$—CH=$CH_2$ |
| H | Cl | OH | —$CH_2$—C≡CH |
| H | Cl | OH | —CH($CH_3$)—C≡CH |
| H | Cl | OH | —$CH_2$—$CH_2$—OH |
| H | Cl | OH | —$CH_2$—$(CH_2)_5$—OH |
| H | Cl | OH | —$CH_2$—$CH_2$—O—$C_2H_5$ |
| H | Cl | OH | —$(CH_2)_2$—O—$(CH_2)_2$—O$C_2H_5$ |
| H | Cl | OH | —$(CH_2)_2$—O$CH_2$—$C_6H_5$ |
| H | Cl | OH | ($CH_2$)$_2$—O—⟨C6H4⟩—Cl |
| H | Cl | OH | —CH($CH_3$)—$CH_2$Cl |
| H | Cl | OH | Cyclohexyl. |
| Cl | Cl | OH | $CH_2$CH=$CH_2$ |
| Cl | Cl | OH | $CH_2$—C≡CH |
| Cl | Cl | OH | —$CH_2$—$CH_2$—Cl |
| Cl | Cl | OH | —$CH_3$—C(Cl)=C(Cl)—$CH_3$ |
| Cl | Cl | OH | —$CH_2$—$CH_2$—(naphthyl) |

TABLE—Continued

| R₁ | R₂ | R₃ | R₄ |
|---|---|---|---|
| Cl | Cl | OH | -CH₂-(2-chloronaphthyl) |
| Cl | Cl | OH | —CH₂—CH₂—S—C₆H₅ |
| H | H | Cl | Phenyl. |
| H | H | Cl | Cyclohexyl. |
| H | H | Cl | Cyclopentyl. |
| H | H | Cl | Naphthyl. |
| H | H | Cl | 2,6-dichlorophenyl. |
| H | H | Cl | 2-hydroxycyclohexyl. |
| H | H | Cl | 3,4-methylenedioxy benzyl. |
| Cl | Cl | H | —CH₂—(CH₂)₃—OH |
| Cl | Cl | H | —(CH₂)₂—S—(CH₂)₂—S—C₂H₅ |
| Cl | Cl | H | 2,5-dichlorophenyl. |
| Cl | Cl | H | o-Hydroxyphenyl. |
| Br | Br | OH | —CH₂—C(Cl)=CH₂ |
| Br | Br | OH | —CH₂—CH₂—S—C₂H₅ |
| Br | Br | OH | —CH₂—CH=CH₂ |
| Br | Br | OH | —(CH₂)₂—O—(CH₂)₂—OC₂H₅ |
| I | I | OH | —(CH₂)₃—OH |
| I | I | OH | CH₂—CH₂—O—C₂H₅ |
| I | I | OH | 3,4-dihydroxyphenyl. |
| I | I | OH | 3,4-dichlorophenyl. |
| I | I | H | —CH₂—C≡CH |
| Br | Br | H | —(CH₂)₂—O—(CH₂)₂—OC₂H₅ |
| H | H | Cl | —4-hydroxycyclohexyl. |
| H | H | OH | CH₃—NH₃⁺ |
| H | H | OH | (CH₃)₂—NH₂⁺ |
| H | H | OH | (CH₃)₃—NH⁺ |
| H | H | OH | (C₂H₅)₂—NH₂⁺ |
| H | H | OH | (C₂H₅)₃—NH⁺ |
| H | H | OH | (iso-C₃H₇)—NH₃⁺ |
| H | H | OH | (iso-C₃H₇)₃—NH⁺ |
| H | H | OH | C₈H₁₇—NH₃⁺ |
| H | H | OH | HOC₂H₄—NH₃⁺ |
| H | H | OH | (HOC₂H₄)₂—NH₂⁺ |
| H | H | OH | (HOC₂H₄)₃—NH⁺ |
| H | H | OH | CH₃—(CH₂)₅—C(CH₃)(CH₃)—NH₃⁺ |
| H | H | OH | CH₃—(CH₂)₆—C(CH₃)(CH₃)—NH₃⁺ |
| H | H | OH | CH₃—(CH₂)₁₀—C(CH₃)(CH₃)—NH₃⁺ |
| H | H | OH | CH₃—(CH₂)₁₁—NH₃⁺ |
| H | H | OH | CH₃(CH₂)₇—CH=CH—(CH₂)₇—CH₂—NH—(CH₂)₃—NH₃⁺ |
| H | H | Cl | CH₃—NH₃⁺ |
| H | H | Cl | (CH₃)₂—NH₂⁺ |
| H | H | Cl | (C₂H₅)₂—NH₂⁺ |
| H | H | Cl | iso-C₃H₇—NH₃⁺ |
| H | H | Cl | (HOC₂H₄)₂—NH₂⁺ |
| H | H | Cl | (HOC₂H₄)₃—NH⁺ |
| H | Cl | OH | CH₃—(CH₂)₅—C(CH₃)(CH₃)—NH₃⁺ ⎫ |
| H | Cl | OH | CH₃—(CH₂)₆—C(CH₃)(CH₃)—NH₃⁺ ⎬ in the form of a mixture (Primenes) |
| H | Cl | OH | CH₃—(CH₂)₁₀—C(CH₃)(CH₃)—NH₃⁺ ⎭ |
| H | Cl | OH | CH₃—(CH₂)₁₁—NH₃⁺ |
| H | Cl | OH | CH₃—(CH₂)₉—NH₃⁺ |
| Cl | Cl | OH | (CH₃)₂—NH₂⁺ |
| Cl | Cl | OH | (C₂H₅)₃—NH⁺ |
| Cl | Cl | OH | (C₄H₉)₂—NH₂⁺ |
| Cl | Cl | OH | (C₄H₉)₃—NH⁺ |
| Cl | Cl | OH | HO—C₂H₄NH—CH₂—CH₂—CH₂—NH₃⁺ |
| Cl | Cl | OH | n-C₈H₁₇—NH₃⁺ |
| Cl | Cl | OH | (cyclohexyl-C₂H₅)₂—NH₂⁺ |

TABLE—Continued

| R₁ | R₂ | R₃ | R₄ |
|----|----|----|----|
| Cl | Cl | OH | $CH_3-(CH_2)_{8-10}-\underset{\underset{CH_3}{\mid}}{\overset{\overset{CH_3}{\mid}}{C}}-NH_3^+$ |
| Cl | Cl | OH | $CH_3-(CH_2)_7-CH-CH-(CH_2)_7-CH_2-NH-CH_2-$<br>$CH_2-CH_2-NH_3^+$ |
| H | H | Cl | $(CH_3)_2-NH_2^+$ |
| H | H | Cl | $n\text{-}C_8H_{17}-NH_3^+$ |
| H | H | OH | 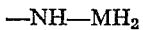 |
| H | H | OH | 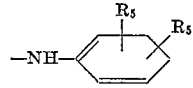 |

The novel active substances are obtainable in accordance with conventional methods. The esters of the fluorene-carboxlic acids can be produced according to conventional esterification techniques, for example by direct esterification of the corresponding acid, acid chlorides, or anhydrides, or also by way of the 9-chlorofluorene-carboxylic acid chloride which is converted into the desired ester in accordance with conventional methods, after which the chlorine atom present in the 9-position can be substituted by a hydroxy group by treatment with silver hydroxide. The novel esters can also be obtained conventionally by re-esterification of preferably lower alkyl esters of the fluorene-carboxylic acids.

Also such compounds wherein Z represents $$-NH-MH_2$$

or $-NH-$ (with $R_5$ substituents on ring)

can be produced in accordance with known methods. Thus, the hydrazides are obtained, for example, by reacting a lower alkyl ester of the corresponding fluorene-9-carboxylic acid with hydrazine hydrate or sulfate. In place of the esters, it is of course also possible to employ the corresponding acid chlorides. The anilides, finally, can be produced, for example, by reacting the corresponding acid chlorides with aniline, or with aniline which has been substituted in the aromatic ring once or twice by halogen (preferably Cl) or OH.

Also the novel amine salts are obtainable by conventional processes. These salts can most readily be produced by direct reaction between the free acid and the amine, or between reactive derivatives of the acid and, if desired, acid addition salts of the amine, particularly the hydrochlorides.

The oil-soluble compounds can be produced preferably directly in suitable oils. For this purpose, the amine is dissolved in the oil and then the corresponding quantity of fluorenol-9-carboxylic acid is added. By this simple mixing process, there occurs a reaction between the amine and the acid in the oil solution. Heating the mixture generally accelerates the reaction, but is not absolutely necessary. In this manner, the desired concentrated oil solutions are obtained which can either be diluted before use with further amounts of oil, with auxiliary solvents, or with water, or mixed with conventional carriers. The oils to be used in this connection are preferably the commercial types, for example aromatic heavy naphtha, kerosene, xylene, as well as light summer oils (high viscosity oil for automotive lubrication in summer weather) and heating oils.

The novel agents of the invention were tested on *Galium aparine* in accordance with a seedling-dropping method which has proven to be extensively specific for recognizing the average development activity. In this test, young plants of *Galium aparine* in the early seedleaf stage are treated with a droplet of 0.02 ml. per seedleaf of the active agents dissolved or suspended in water (concentration 0.01%). The thus-treated plants are kept in the greenhouse under a long day (about 10 hours) for three weeks. To evaluate the effects, observations are then made of:

(a) The reduction of the leaf spread.
(b) The inhibition of the longitudinal growth of the axil.

The morphogenetic modifications become more pronounced as the duration of the test increases. The point at which the effectiveness of the novel agents can be determined is in part extremely low, i.e. the effect can be demonstrated at very low concentrations.

The active agents can be worked up into all forms of preparations usually employed in conjunction with plant protective agents or plant combating agents. Conventional additives and fillers are used for solids preparations, such as, for example, bole, kaolin, bentonite, ground shale, talc, chalk, dolomite, or kiesel-guhr.

For liquid formulations, preferred solvents are xylene, solvent naphtha, petroleum, acetone, cyclohexane, dimethyl formamide, dimethyl sulfoxide, or alipahtic alcohols. Emulsion concentrates produced in this manner can be marketed as such. Before use, the emulsion concentrates are diluted with water in the usual manner. If agents are used containing, as the active substance, substances soluble in water, it is of course possible to employ water as the solvent or diluent for preparing the concentrate. The application can be done by soil treatment in the pre-sowing or pre-germination process, or by plant treatment in the post-germination process, by spraying, pouring, scattering, dusting, or also by rubbing, powdering, injection, infiltration, or soaking of plants or plant parts, such as tubers, bulbs, or seeds, etc.

When the fluorene-9-carboxylic acid derivatives are formulated as emulsion concentrates, it is preferred to use a total content of said active material of 5–95, preferably 50% by weight. Likewise, when the fluorene-9-carboxylic acid derivatives are combined with herbicidal and/or growth-regulating substances, the total content of active substances ranges within these limits.

Since the agents of the invention exhibit such varied effects when applied to plants, and since they can be used, moreover, in conjunction with the diverse active substances influencing plant growth, a wide variety of applications is indicated.

Thus, the novel agents of the invention are particularly suitable for chemical growth attentuation, i.e. for gently controlling mixed vegetation, at ditch embankments, dams, roadsides, etc. Chemical growth attenuation is also possible with the agents of the invention in all places where a certain ground coverage by plants (shade) must be retained, i.e., where customary herbicides cannot be employed.

The fluorene derivatives of the invention can also be employed for retarding the flowering time in case of flowers, or in orchards and vineyards, for protection against frost damage, for delaying the sprouting, for example, of lettuce, or for influencing the ripening time. The compounds are likewise suitable for improving the fruit formation, for thinning the fruit, and for preventing the premature dropping of the fruit. Furthermore, a promotion of the flower formation, or also seedless fruit (parthenocarpy) can be obtained with the agents of the invention.

The novel agents of the invention can also be employed for various purposes combined with herbicides of all types, or with growth-regulating substances. They can serve, for example, as systematically effective herbicidal agents for keeping down plant growth and/or for destroying such plant growth totally or selectively. Of particular importance, there is obtained in this manner an improvement in the effectiveness of known herbicides against hardy rooted weeds, as well as an improved spectrum in the effectiveness of such herbicides. The excellent effect of the novel agents of the invention is manifest by the fact that it is possible by means of these novel agents to combat dicotyledonous weeds which can hardly be destroyed by the known herbicides, and if at all, only with great difficulties. Such combined agents according to this invention are therefore particularly suitable for combating broad-leaved weeds in cultivated areas of useful monocotyledonous plants.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

(A) PRODUCTION OF THE NOVEL FLUORENE-9-CARBOXLIC ACID DERIVATIVES

Example 1

20 g. 9-fluorenol-9-carboxylic acid are boiled with 20 g. 2-methyl-allyl alcohol and 1 g. p-toluene-sulfonic acid in 200 ml. toluene for 45 minutes in a water separator until 1.7 ml. water is separated. The toluene solution is washed with 30 ml. saturated sodium bicarbonate solution, and the toluene is then distilled off. The 9-fluorenol-9 - carboxylic acid-2'-methyl-allyl ester is recrystallized from toluene, M.P. 139–141° C.

Correspondingly, there are produced:

9-fluorenol-9-carboxylic acid-allyl-ester, M.P. 66–67° C.;
9-fluorenol-9-carboxylic acid-2',3'-dichloroallyl-ester;
9-fluorenol-9-carboxylic acid-2',3',3'-trichloroallyl-ester, M.P. 116–118° C.;
9-fluorenol-9-carboxylic acid-propargyl-ester, M.P. 91–92° C.;
9-fluorenol-9-carboxylic acid-isobutenyl-ester, M.P. 139–141° C.;
9-fluorenol-9-carboxylic acid-4'-hyroxy-butenyl-(2')-ester, M.P. 63–64° C.;
9-fluorenol-9-carboxylic acid-4'-chloro-butenyl-(2')-ester, M.P. 92–95° C.;
9-fluorenol-9-carboxylic acid-4'-chloro-butynyl-(2')-ester, M.P. 80–81° C.;
9-fluorenol-9-carboxylic acid -2'-chloro-butenyl-(2')-ester, M.P. 98° C.;
9-fluorenol-9-carboxylic acid-3'-chloro-butenyl-(2')-ester, oil;
9-fluorenol-9-carboxylic acid-3'-hydroxy-propyl-ester, M.P. 112–113° C.;
9-fluorenol-9-carboxylic acid-6'-hydroxy-hexyl-ester, M.P. 78–80° C.;
9-fluorenol-9-carboxylic acid-2',2'-dimethyl-3'-hydroxy-propyl-ester, M.P. 86–87° C.;
9-fluorenol-9-carboxylic acid-2'-ethoxyethyl-ester, M.P. 61–62° C.;
9-fluorenol-9-carboxylic acid-2'-ethoxy-ethoxyethyl-ester, B.P. 196–197° C./0.02 mm.;
9-fluorenol-9-carboxylic acid-2'-butoxyethyl-ester, B.P. 167–171° C./0.04 mm.;
9-fluorenol-9-carboxylic acid-2'-benzyloxyethyl-ester;
9-fluorenol-9-carboxylic acid-2'-p-chlorophenoxyethyl-ester, M.P. 106–107° C.;
9-fluorenol-9-carboxylic acid-phenethyl 1-ester, M.P. 64–65° C.;
9-fluorenol-9-carboxylic acid-$\beta,\beta'$-diethoxy-isopropyl-ester, M.P. 52–54° C.;
9-fluorenol-9-carboxylic acid-2',3'-(isopropylidenedioxy)-propyl-ester, B.P. 210° C./0.02 mm.;
9-fluorenol-9-carboxylic acid-2'-chloroethyl-ester, M.P. 83–84° C.;
9-fluorenol-9-carboxylic acid -6'-chlorohexyl-ester, M.P. 61–62° C.;
9-fluorenol-9-carboxylic acid-$\beta$-chloroisopropyl-ester, M.P. 117° C.;
9-fluorenol-9-carboxylic acid-cyclohexyl-ester, M.P. 67–68° C.;
9-fluorenol-9-carboxylic acid-benzyl-ester, M.P. 83–84° C.;
9-fluorenol-9-carboxylic acid-o-chlorobenzyl-ester, M.P. 112–113° C.;
9-fluorenol-9-carboxylic acid-m-chlorobenzyl-ester, M.P. 88–89° C.;
9-fluorenol-9-carboxylic acid-p-chlorobenzyl-ester, M.P. 112–113° C.;
9-fluorenol-9-carboxylic acid-2',6'-dichlorobenzyl-ester, M.P. 172–173° C.;
2-chloro-9-fluorenol-9-carboxylic acid-allyl-ester, M.P. 94–96° C.;
2-chloro-9-fluorenol-9-carboxylic acid-2',3'-dichloroallyl-ester;
2-chloro-9-fluorenol-9-carboxylic acid-2',3',3'-trichloroallyl-ester;
2-chloro-9-fluorenol-9-carboxylic acid-propargyl-ester, B.P. 160–161° C./0.01 mm.;
2-chloro-9-fluorenol-9-carboxylic acid-1'-methyl-propynyl-(2)-ester, M.P. 125–131° C.;
2-chloro-9-fluorenol-9-carboxylic acid-3'-chlorobutenyl-ester;
2-chloro-9-fluorenol-9-carboxylic acid-2'-hydroxyethyl-ester, M.P. 133–136° C.;
2-chloro-9-fluorenol-9-carboxylic acid-2'-hydroxy-hexyl-ester, M.P. 95–103° C.;
2-chloro-9-fluorenol-9-carboxylic acid-2'-ethoxyethyl-ester, B.P. 186–188° C./0.01 mm.;
2-chloro-9-fluorenol-9-carboxylic acid-2'-ethoxy-ethoxyethyl-ester, B.P. 195–197° C./0.01 mm.;
2-chloro-9-fluorenol-9-carboxylic acid-2'-benzyloxyethyl-ester, M.P. 91–93° C.;
2-chloro-9-fluorenol-9-carboxylic acid-2'-p-chlorophenoxyethyl-ester, B.P. 260–264° C./0.01 mm.;
2-chloro-9-fluorenol-9-carboxylic acid-2'-chloroethyl-ester, M.P. 95–99° C.;
2-chloro-9-fluorenol-9-carboxylic acid-2'-chloroisopropyl-ester, B.P. 167–168° C./0.01 mm.;
2,7-dichloro-9-fluorenol-9-carboxylic acid-allyl-ester, M.P. 247–249° C.;
2,7-dichloro-9-fluorenol-9-carboxylic acid-propargyl-ester, M.P. 241–243° C.;
2,7-dichloro-9-fluorenol-9-carboxylic acid-$\beta$-chloroethyl-ester, M.P. 136–140° C.

Example 2

22.6 g. fluorenol-9-carboxylic acid-9 are dissolved in 100 ml. 1 N NaOH. There are added to this solution under stirring a solution of 16.9 g. silver nitrate in 30 ml. water. The precipitated silver salt is vacuum-filtered, washed in alcohol, and dried. The salt is suspended in 50 ml. dimethyl formamide and there are added dropwise under stirring 12.5 g. methylthioethyl chloride to the suspension. The mixture is heated for about 30 minutes to 40–50° C., then poured into 200 ml. water, and extracted with methylene chloride. The extract is filtered over charcoal, and the solvent is distilled off. The residue is chromatographed on a silica gel column. There are obtained 10.5 g. of 9-fluorenol-9-carboxylic acid-2-methylthio-ethyl ester, B.P. 186° C./1 mm.

Example 3

22.6 g. 9-fluorenol-9-carboxylic acid, 21 g. butyne-1-ol-3, and 30 ml. ether saturated with HCl are allowed to stand for 2 days at room temperature, and then, the reaction mixture is poured onto ice. The separated ether layer is washed in a solution of sodium bicarbonate. The ether is distilled offff, and the residue is distilled under vacuum. There are obtained 11.5 g. 9-fluorenol-9-carboxylic acid-1'-methyl-propynyl-(2')-ester, B.P.$_{0.1}$ 162–164° C. The distillate solidifies and can be recrystallized from hexane; M.P. 66–67° C.

Analogously, the 2-chloro-9-fluorenol-9-carboxylic acid cyclohexyl ester is produced.

Example 4

26.3 g. 9-chloro-fluorene-9-carboxylic acid chloride are dissolved in 150 ml. benzene. To this solution, there is added dropwise a solution of 9.4 g. phenol and 8.0 ml. pyridine in 50 ml. benzene. The temperature is maintained at 35° C. There are added 200 ml. water, the separated benzenic solution is washed with solution of sodium bicarbonate, and the benzene is distilled off. The residue is recrystallized from carbon tetrachloride. There is obtained the 9-chloro-fluoroene-9-carboxylic acid phenyl ester, M.P. 118–120° C.

In an analogous manner, there are produced:

9-chlorofluorene-9-carboxylic acid-p-chlorophenyl ester, M.P. 143–145° C.;
9-chlorofluorene-9-carboxylic acid-2,6-dichlorophenyl ester, M.P. 113–115° C.

Example 5

30 g. 9-fluorenol-9-carboxylic acid-methyl ester and 30 g. piperonyl alcohol are heated to 150° C. Then, 0.01 g. sodium are added. After a short period of time, the reaction commences, and methanol distills off. The reaction mixture is maintained at 150° C. for 3 hours, then cooled, and dissolved in benzene. The precipitated crystals are recrystallized from benzene. There is thus obtained the 9-fluorenol-9-carboxylic acid-3',4'-methylene-dioxybenzyl ester, M.P. 118–119° C.

Example 6

20 g. 2-chloro-9-fluorenol-9-carboxylic acid, 10 ml. concentrated sulfuric acid, and 300 ml. allyl alcohol are boiled for 16 hours under reflux. The reaction mixture is concentrated under vacuum, dissolved in ether, and the ether solution is washed with sodium bicarbonate and water, dried, and the solvent is distilled off. The residue is a dark oil which is recrystallized from hexane with charcoal. The melting point of the 2-chloro-9-fluorenol-9-carboxylic acid allyl ester is 94–96° C.

Example 7

15 g. 9-fluorenol-9-carboxylic acid methyl ester are dissolved in 40 ml. dimethyl formamide, mixed with 20 ml. 75% hydrazine hydrate, and allowed to stand at room temperature for 2 days. Then the reaction mixture is diluted with water, the separated crystals are vacuum-filtered, and a washing step with alcohol is conducted. There is obtained the 9-fluorenol-9-carboxylic acid hydrazide, M.P. 252° C.

Example 8

A solution of 3.1 g. methyl amine in 30 ml. alcohol is added to a solution of 26 g. 2-chloro-9-fluorenol-9-carboxylic acid in 500 ml. ether. The methyl amine salt of 2-chloro-9-fluorenol-9-carboxylic acid precipitates first in oily form and crystallizes after a short time. The product is vacuum-filtered and washed with ether.

Example 9

22.6 g. 9-fluorenol-9-carboxylic acid are dissolved in 50 ml. alcohol and mixed with 19.2 g. of a mixture of tert.-butyl amine and tert.-octyl amine. The alcohol is distilled off under reduced pressure. The residual oily salt is soluble in petroleum.

Example 10

26 g. 2-chloro-9-fluorenol-9-carboxylic acid and 26.5 g. technical soybean oil amine (a mixture of predominantly oleyl, stearyl, and cetyl amine) are mixed with 100 ml. of solvent naphtha and 5 ml. dimethyl formamide. A solution is obtained which is processed directly to form an emulsion concentrate by the addition of a customary emulsifier.

Example 11

26 g. 2-chloro-9-fluorenol-9-carboxylic acid and 19.2 g. of a technical mixture of primary amines whose tertiary alkyl groups have 12–18 carbon atoms, are dissolved in 100 ml. solvent naphtha with 10 g. alkylol amine sulfonate to form an emulsion concentrate.

Example 12

Analogously to Example 11, the corresponding amine salt is produced from 22.6 kg. 9-fluorenol-9-carboxylic acid and 19.2 kg. of the amine mixture.

Example 13

There are dissolved in 100 ml. xylene:

| | |
|---|---|
| Dimethyl formamide ml | 2 |
| Soybean oil amine g | 27 |
| 3,5-diiodo-4-hydroxy-benzonitrile g | 18.5 |
| 9-fluorenol-9-carboxylic acid g | 11.3 |
| and | |
| Alkylol amine sulfonate g | 1 |

The solution is an emulsion concentrate.

(B) PREPARATION OF COMPOSITIONS FOR APPLICATION TO PLANTS

Example 14

| | Percent |
|---|---|
| 9-fluorenol-9-carboxylic acid-allyl-ester | 25 |
| Dimethyl formamide | 5 |
| Xylene | 45 |
| Alkylolamine sulfonate | 25 |

Example 15

| | Percent |
|---|---|
| 9-fluorenol - 9-carboxylic acid-2-n - butoxy-ethyl-ester | 12.5 |
| Xylene | 82.5 |
| Alkylaryl sulfonate+sorbitol polyoxyethylene ether | 5 |

Example 16

| | |
|---|---|
| 2,7-dichloro-9 - fluorenol - 9-carboxylic acid-propargyl-ester | 0.5 |
| Alkylnaphthalene sulfonate | 0.5 |
| Sulfite waste liquor powder | 10 |
| Silicic acid | 3 |
| Bole | 36.5 |

Example 17

| | Percent |
|---|---|
| 9-chloro-fluorene-9-carboxylic acid-p - chlorophenyl-ester | 50 |
| Oleic acid N-methyl-tauride | 10 |
| Silicic acid | 3 |
| Siliceous chalk | 37 |

Example 18

| | G. |
|---|---|
| 2-methyl-4-chlorophenoxy acetic acid-isooctyl-ester | 42 |
| 9-fluorenol-9-carboxylic acid-allyl-ester | 10 |
| Petroleum | 23 |
| Xylene | 20 |
| Emulsifier | 5 |

Example 19

| | G. |
|---|---|
| 2-methyl-4-chlorophenoxy acetic acid-isooctyl-ester | 42 |
| 9-fluorenol-9-carboxylic acid-propargyl-ester | 3 |
| Polyoxyethylene-sorbitol-ester+alkylaryl sulfonate | 5 |
| Solvent naphtha | 50 |

Example 20

| | G. |
|---|---|
| 4-chloro-2-methyl-phenoxypropionic acid-butylglycol-ester | 35 |
| 9-fluorenol-9-carboxylic acid-4-chloro-butynyl-(2)-ester | 10 |
| Alkylphenol polyglycol ether | 10 |
| Petroleum | 45 |

Example 21

| | G. |
|---|---|
| 2,4-dichlorophenoxy acetic acid-isopropyl-ester | 42 |
| 9-fluorenol-9-carboxylic acid-p-chlorophenoxyethyl-ester | 10 |
| Solvent naphtha | 43 |
| Emulsifier | 5 |

Example 22

| | G. |
|---|---|
| Chloromethyl-phenoxypropionic acid-butylglycol-ester | 30 |
| 9-fluorenol-9-carboxylic acid-p-chlorobenzyl-ester | 20 |
| Fatty alcohol polyglycolether | 15 |
| Acetone | 35 |

Example 23

| | G. |
|---|---|
| 2-methyl-4-chlorophenoxy-acetic acid-isooctyl-ester | 20 |
| 2-chloro-9-fluorenol-9-carboxylic acid-allyl-ester | 5 |
| Turkey red oil | 25 |
| Dimethyl formamide | 50 |

Example 24

| | G. |
|---|---|
| 2,4,5-trichlorophenoxy acetic acid methyl-ester | 25 |
| 2-chloro-9-fluorenol-9-carboxylic acid-p-chloroethyl-ester | 25 |
| Cell pitch (a product from the evaporation of sulfite waste liquor) | 15 |
| Alkylnaphthalene sulfate | 0.5 |
| Bole | 34.5 |

Example 25

| | G. |
|---|---|
| 2,4-dichlorophenoxypropionic acid-methyl-ester | 20 |
| 2,7-dichloro-9-fluorenol-9-carboxylic acid-propargyl-ester | 4 |
| Oleic acid-N-methyl-tauride | 8 |
| Bentonite | 68 |

Example 26

| | G. |
|---|---|
| 2-chloro-4,6-bis-(ethylamino)-triazine | 30 |
| 9-chloro-fluorene-9-carboxylic acid-p-chlorophenyl-ester | 3 |
| Sulfite waste liquor powder | 20 |
| Alkylnaphthalene sulfonate | 0.5 |
| Bole | 26.5 |
| Talc | 20 |

Example 27

| | G. |
|---|---|
| 2-methyl-4-chlorophenoxy-butyric acid | 20 |
| 9-fluorenol-9-carboxylic acid-hydrazide | 30 |
| Sulfite waste liquor powder | 19.5 |
| Alkylnaphthalene sulfonate | 0.5 |
| Kaolin | 30 |

Example 28

Water-soluble concentrate:

| | Percent |
|---|---|
| 9-fluorenol-9-carboxylic acid, dimethylamine salt | 40 |
| Methanol | 10 |
| Water | 50 |

Example 29

Water-soluble concentrate:

| | Percent |
|---|---|
| 2-chloro-9-fluorenol-9-carboxylic acid, ethanolamine salt | 30 |
| Water | 70 |

Example 30

Water-soluble preparation:

| | Percent |
|---|---|
| 2,7-dichloro-9-fluorenol-9-carboxylic acid, tiethylamine salt | 25 |
| Ethanol | 5 |
| Water | 70 |

Example 31

Emulsion concentrate:

| | Percent |
|---|---|
| 9-fluorenol-9-carboxylic acid, primene salt (mixture of tert. $C_{12}H_{25}NH_2$, tert. $C_{13}H_{27}NH_2$ and tert. $C_{14}H_{29}NH_2$) | 20 |
| Technical aromatic mixture, B.P. 150–180° C. | 55 |
| Alkylolamine sulfonate | 25 |

Example 32

Emulsion concentrate:

| | Percent |
|---|---|
| 2-chloro-9-fluorenol-9-carboxylic acid, N-oleyl-1,3-propylenediamine salt | 25 |
| Xylene | 40 |
| Alkylolamine sulfonate | 25 |

Example 33

Emulsion concentrate:

| | G. |
|---|---|
| 9-fluorenol-9-carboylic acid are introduced into the solution of | 225 |
| Technical cocoanut oil amine | 200 |
| and | |
| Aromatic heavy naphtha | 575 | and slowly heated until a clear solution is obtained. The thus-produced mixture can easily be put into a suitable form of application by additional quantities of oil (aromatic heavy naphtha, xylene, aliphatic oils, such as naphtha benzines, kerosene, petroleum) and emulsifiers.

Example 34

Aqueous solution:

| | G. |
|---|---|
| 9-fluorenol-9-carboxylic acid, dimethylamine salt | 10 |
| 2,4-dichlorophenoxy-acetic acid, dimethylamine salt | 15 |
| 2-methyl-4-chlorophenoxy-acetic acid, dimethylamine salt | 15 |
| Water | 60 |

Example 35

Emulsion concentrate:

| | Percent |
|---|---|
| 9-fluorenol-9-carboxylic acid, primene salt | 10 |
| 2-methyl-4-chlorophenoxy-acetic acid, primene salt (respectively a mixture of tert. $C_{12}H_{25}NH_2$, tert. $C_{13}H_{27}NH_2$, and tert. $C_{14}H_{29}NH_2$) | 25 |
| Technical aromatic mixture | 50 |
| Alkylolamino sulfonate | 15 |

Example 36

Spray powder:

| | Kg. |
|---|---|
| 2-chloro-fluorenol-9-carboxylic acid-allyl ester | 20 |
| Maleic acid hydrazide | 40 |
| Sulfite waste liquor powder | 10 |
| Alkylnaphthalene sulfonate | 1 |
| Bole | 29 |

Example 37

Emulsion concentrate:

| | | |
|---|---|---|
| 9-fluorenol-9-carboxylic acid | g | 22.6 |
| Soybean oil amine | g | 26.5 |
| Alkylolamino sulfonate | g | 20 |
| Solvent naphtha | ml | 100 |

Example 38

Dusting agent:

| | Part |
|---|---|
| 2-chloro-9-fluorenol-9-carboxylic acid | 1 |
| Allyl ester and bolus | 1 | are ground together and are then mixed with

| | |
|---|---|
| Petroleum jelly oil | 0.4 |
| and | |
| Fine sand | 97.6 |

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof can make various changes and modifications of the invention to adapt it to various usages and conditions. Consequently, such changes and modifications are properly, equitably, and intended to be, within the full range of equivalence of the following claims.

What is claimed is:
1. Compounds of the formula

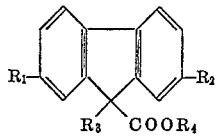

wherein
$R_1$ and $R_2$ each represents H, or Cl;
$R_3$ represents H, OH or Cl;
$R_4$ represents allyl, propargyl, butenyl, or butynyl; allyl, butenyl or butynyl substituted by OH or chlorine unsubstituted phenyl or phenyl substituted by 1–3 chlorine atoms.

2. A compound selected from the group consisting of 2-chloro-9-fluorenol-9-carboxylic acid p-chlorophenoxyethyl ester, 9-fluorenol-9-carboxylic acid allyl ester, 9-fluorenol-carboxylic acid propargyl ester, 9-fluorenol-9-carboxylic acid-2′,3′-dichloro-allyl ester, 2-chloro-9-fluorenol-9-carboxylic acid allyl ester, 2-chloro-9-fluorenol-9-carboxylic acid propargyl ester, 2-chloro-9-fluorenol-9-carboxylic acid-2′,3′-dichloroallyl ester, and 9-chlorofluorene-9-carboxylic acid-p-chlorophenyl ester.

3. A compound as defined by claim 2 wherein said compound is 2-chloro-9-fluorenol-9-carboxylic acid p-chlorophenoxyethyl ester.

4. A compound as defined by claim 2 wherein said compound is 9-fluorenol-9-carboxylic acid allyl ester.

5. A compound as defined by claim 2 wherein said compound is 9-fluorenol-carboxylic acid propargyl ester.

6. A compound as defined by claim 2 wherein said compound is 9-fluorenol-9-carboxylic acid-2′,3′-dichloro-allyl-ester.

7. A compound as defined by claim 2 wherein said compound is 2-chloro-9-fluorenol-9-carboxylic acid allyl ester.

8. A compound as defined by claim 2 wherein said compound is 2-chloro-9-fluorenol-9-carboxylic acid propargyl ester.

9. A compound as defined by claim 2 wherein said compound is 2-chloro-9-fluorenol-9-carboxylic acid-2′,3′-dichloroallylester.

10. A compound as defined by claim 2 wherein said compound is 9-chloro-fluorene-9-carboxylic acid-p-chlorophenyl ester.

References Cited

UNITED STATES PATENTS

Re. 23,115  5/1949  Lontz _____ 260—521 A

FOREIGN PATENTS 640,592  4/1964  Belgium.

OTHER REFERENCES

Jones et al.: J. Sci. Food Agric. 5, 44 (1954).

LORRAINE A. WEINBERGER, Primary Examiner

J. F. TERAPANE, Assistant Examiner

U.S. Cl. .R.

260—473 F, 501.1, 501.17